United States Patent [19]

Tsao

[11] Patent Number: 5,148,145
[45] Date of Patent: Sep. 15, 1992

[54] AUTOMOBILE ELECTRONIC ALARM DEVICE

[76] Inventor: Grant Tsao, No. 2, Lane 230, Ta-Tung S. Road, San-Chung City, Taipei Hsien, Taiwan

[21] Appl. No.: 698,698

[22] Filed: May 13, 1991

[51] Int. Cl.$^5$ ............................................. B60R 25/10
[52] U.S. Cl. ................................. 340/429; 180/287; 307/10.2; 340/426
[58] Field of Search ............... 340/426, 427, 428, 429, 340/430; 307/10.2; 180/287

[56] References Cited

U.S. PATENT DOCUMENTS

| | | | |
|---|---|---|---|
| 4,363,021 | 12/1982 | Koubecky | 340/429 |
| 4,658,237 | 4/1987 | Williamson | 340/426 |
| 4,663,611 | 5/1987 | Humphrey | 340/426 |
| 4,782,321 | 11/1988 | Colvin | 340/426 |
| 4,796,002 | 1/1989 | Heidman, Jr. | 180/287 |
| 4,897,630 | 1/1990 | Nykerk | 340/426 |
| 4,910,493 | 3/1990 | Chambers et al. | 340/426 |

Primary Examiner—Jin F. Ng
Assistant Examiner—Brent A. Swarthout
Attorney, Agent, or Firm—Finnegan, Henderson, Farabow, Garrett & Dunner

[57] ABSTRACT

An automobile electronic alarm device alternatingly produces an alarm sound signal and a speech sound signal when an attempt to burglarize or steal the automobile is made. The speech sound signal can correspond to a combination of the digits found in a license plate of the automobile so as to provide a distinct alarm sound output.

7 Claims, 2 Drawing Sheets

AUTOMOBILE ELECTRONIC ALARM DEVICE

BACKGROUND OF THE INVENTION

1. Field of the Invention

The invention relates to an automobile electronic alarm device, more particularly to an automobile electronic alarm device having a distinct alarm sound output.

2. Description of the Related Art

Presently, various locks and electronic alarm devices are installed to protect an automobile against burglary and theft. There is a type of electronic alarm device available wherein a plurality of control switches are connected to a microprocessor unit. The control switches are associated with locks provided at the doors of the automobile and at the engine hood. The control switches further include a level sensor provided on the chassis. Thus, whenever a thief tries to pick any lock on the automobile or when the automobile inclines by more than a predetermined angle (such as 15 degrees) relative to the ground, the microprocessor unit triggers a sound generating unit to produce a loud alarm sound to scare off the would-be thief.

A main disadvantage of this type of electronic alarm device is that it is already installed in most automobiles and is capable of emitting only one kind of alarm sound output. Thus, if the automobile was parked in an area where there are many vehicles, it would be difficult to ascertain, without actual inspection, if the alarm sound came from one's automobile or not. The owner would therefore have to rush to his automobile to quell his fears. After experiencing several false alarms, the owner would eventually become careless, so that the next time he hears an alarm sound, he would probably decide, without checking, that the alarm sound came from another vehicle.

SUMMARY OF THE INVENTION

Therefore, the main objective of the present invention is to provide an automobile electronic alarm device which has a distinct alarm sound output to overcome the drawbacks commonly associated with the prior art.

Accordingly, the preferred embodiment of an automobile electronic alarm device of the present invention comprises a detecting means including at least one control switch means provided on the automobile and actuated whenever an attempt to burglarize or steal the automobile is initiated, and a sound generating means actuated by the detecting means and alternatingly producing an alarm sound signal and a speech sound signal for as long as the control switch means is in an actuated state. The control switch means remains in the actuated state for as long as the attempt to burglarize or steal the automobile is ongoing. The speech sound signal can be made to correspond to a combination of the digits found in a license plate of the automobile. The alarm sound output of the preferred embodiment is thus distinguishable from the alarm sound output of conventional automobile electronic alarm devices.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
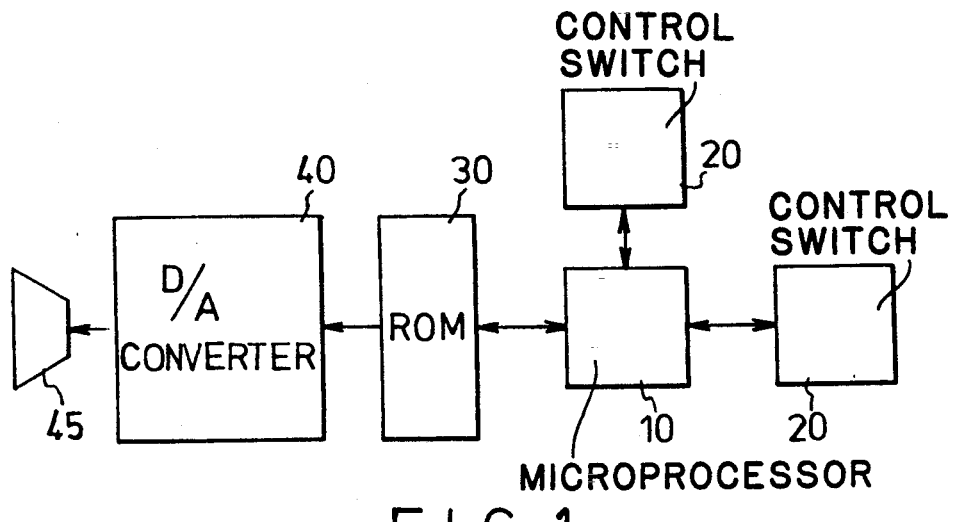
FIG. 1 is a schematic block diagram of the first preferred embodiment of an automobile electronic alarm device according to the present invention.

Referring to FIG. 1, the first preferred embodiment of an automobile electronic alarm device according to the present invention is shown to comprise a microprocessor unit 10, control switches 20, a read-only memory unit (ROM) 30, a digital-to-analog (D/A) converter 40, and a loudspeaker 45.

The control switches 20 re similar to those found in conventinal electronic alarm devices and will not be detailed further. The control switches 20 and the ROM 30 are linked to the microprocessor unit 10. The output of the ROM 30 is connected to the D/A converter 40, while the output of the D/A converter 40 drives the loudspeaker 45.

Figure 2:
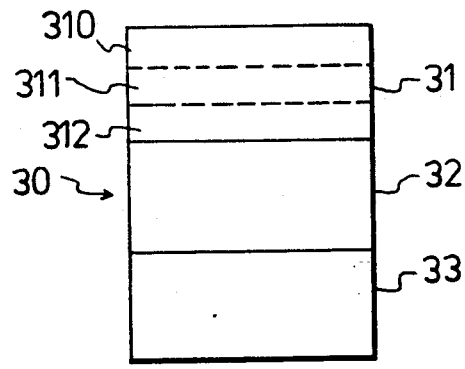
FIG. 2 is an illustration of the memory allocation for a read-only memory unit of the first preferred embodiment.

Referring to FIG. 2, the contents of the ROM 30 are divided into three regions. The first region 31 contains a computer program. The computer program is divided into a main routine 310, a first subroutine 311, and a second subroutine 312. The second region 32 contains a digitally encoded alarm sound signal and is accessed when the first subroutine 311 is called. The third region 33 contains a digitally encoded speech sound signal and is accessed when the second subroutine 312 is called. The digitally encoded speech sound signal can correspond to the last four digits of the license plate of the automobile.

The operation of the first preferred embodiment is as follows: One of the control switches 20 is actuated whenever an attempt to pick the locks of the automobile or an attempt to tow the automobile is initiated. Actuation of the control switches 20 is detected by the microprocessor unit 10 which responds by reading the computer program stored in the ROM 30. The microprocessor unit 10 then executes the program instructions and controls the ROM 30 to output the digitally encoded alarm sound signal and the digitally encoded speech sound signal, in that order. The digital signal output of the ROM 30 is converted by the D/A converter 40 into analog signals which are then converted into audible sound signals by the loudspeaker 45. The computer program includes a loop routine so that the microprocessor unit 10 can continuously control the ROM 30 to alternatingly output the digitally encoded alarm sound signal and the digitally encoded speech sound signal, so that the loudspeaker 45 can continuously produce audible and distinguishable sound signals for as long as the control switches 20 remain actuated.

Figure 3:
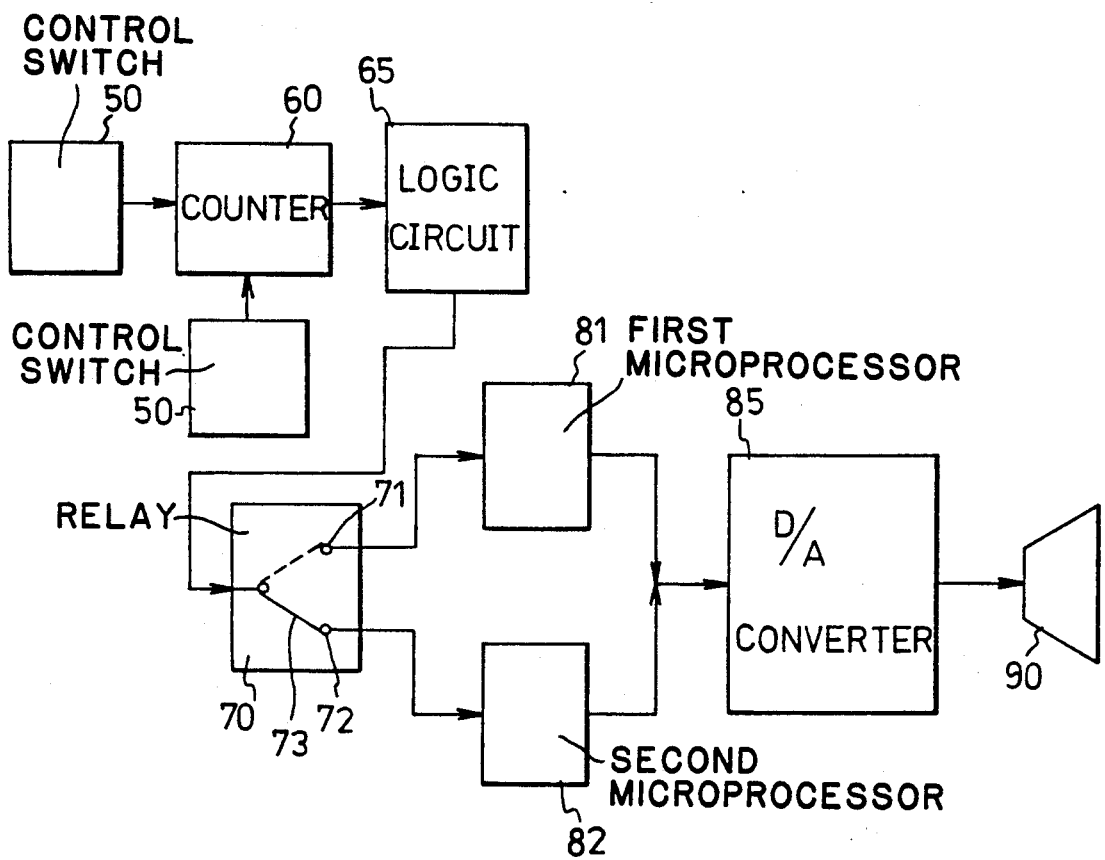
FIG. 3 is a schematic block diagram of the second preferred embodiment of an automobile electronic alarm device according to the present invention.

Referring to FIG. 3, the second preferred embodiment of an automobile electronic alarm device according to the present invention is shown to comprise: control switches 50, a binary counter 60, a logic circuit 65, a relay 70, a first microprocessor unit 81, a second microprocessor unit 82, a digital-to-analog (D/A) converter 85, and a loudspeaker 90.

The control switches 50 are similar to those found in the first preferred embodiment and are used to actuate the binary counter 60. The logic circuit 65 controls the direction of current through the relay 70 according to the output of the binary counter 60. The relay 70 has a first fixed contact 71 connected to the first microprocessor unit 81, a second fixed contact 72 connected to the second microprocessor unit 82, and a movable contact arm 73 to be selectively connected to one of the first and second fixed contacts, 71 and 72. The first microprocessor unit 81 has a memory unit containing a digitally encoded alarm sound signal. The second microprocessor unit 82 has a memory unit containing a digitally encoded speech sound signal. As with the first preferred embodiment, the digitally encoded speech sound signal can correspond to the last four digits of the license plate of the automobile. The ditigal outputs of the first and second microprocessor unit, 81 and 82, are converted into analog signals by the D/A converter 85. The analog output of the D/A converter 85 is transformed into audible sound signals by the loudspeaker 90.

The operation of the second preferred embodiment is as follows: One of the control switches 50 is actuated whenever an attempt to pick the locks of the automobile or an attempt to tow the automobile is initiated. This triggers the binary counter 60 to begin producing an incrementing digital output. If the output of the counter 61 has not yet reached a predetermined count (such as 1010), the logic circuit 65 supplies current to the relay 70 so that the movable contact arm 73 of the relay 70 is connected to the first fixed contact 71, thereby actuating the first microprocessor unit 81. The first microprocessor unit 81 outputs the digitally encoded alarm sound signal, which is transformed into an analog signal by the D/A converter 85. The output of the D/A converter 85 is finally converted into an audible alarm sound signal by the loudspeaker 90.

When the output of the binary counter 60 reaches the predetermined count, the logic circuit 65 reverses the direction of current to the relay 70 as to connect the movable contact arm 73 of the relay 70 to the second fixed contact 72, thereby actuating the second microprocessor unit 82. The second microprocessor unit 82 outputs the digitally encoded speech sound signal, which is transformed into a corresponding analog signal by the D/A converter 85. The output of the D/A converter 85 is finally converted into an audible speech sound signal by the loudspeaker 90. The binary counter 60 has a recurring output, that is, the digital output thereof resets to 0000, and the binary counter 60 begins a new count after it reaches the count 1111.

The binary counter 60 is designed to increment by one unit for each second of operation. Thus, for the first ten seconds, the sound output of the second preferred embodiment is the sound alarm signal. The sound output for the next five seconds is the speech sound signal. This fifteen second cycle is once more repeated for as long as one of the contact switches 50 is in an actuated state.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. An electronic alarm device to be installed in an automobile having a license plate, comprising:

a detecting means including at least one control switch means provided on the automobile and actuated whenever an attempt to burglarize or steal the automobile is initiated, said control switch means remaining in an actuated state for as long as the attempt to burglarize or steal the automobile is ongoing; and a sound generating means actuated by said detecting means and alternatingly producing an alarm sound signal and a speech sound signal corresponding to a combination of the digits found in the license plate of the automobile for as long as said control switch means is in the actuated state.

2. The electronic alarm device as claimed in claim 1, wherein said sound generating means comprises:

a first memory means containing first digital data corresponding to a digital representation of said alarm sound signal;

a second memory means containing second digital data corresponding to a digital representation of said speech sound signal;

a microprocessor means alternatingly accessing said first and said second memory means to alternatingly output said first and said second digital data for as long as said control switch means is in the actuated state;

a converter means electrically connected to said first and said second memory means and converting said first and said second digital data into a corresponding analog signal; and a loudspeaker means receiving said analog signal from said converter means so as to generate said alarm sound and said speech sound signals.

3. The electronic alarm device as claimed in claim 2, wherein said first and said second memory means are incorporated in a single memory unit.

4. The electronic alarm device as claimed in claim 1, wherein said control switch means is provided on a lock of the automobile.

5. The electronic alarm device as claimed in claim 1, wherein said control switch means is a level detector which is actuated whenever the automobile inclines by more than a predetermined angle relative to the ground.

6. The electronic alarm device as claimed in claim 1, wherein said sound generating means comprises:

a first microprocessor means to output first digital data corresponding to a digital representation of said alarm sound signal;

a second microprocessor means to output second digital data corresponding to a digital representation of said speech sound signal;

a microprocessor controlling means alternatingly controlling said first and said second microprocessor means to alternatingly output said first and said second digital data whenever said control switch means is in the actuated state;

a converter means electrically connected to said first and said second microprocessor means to convert said first and said second digital data into a corresponding analog signal; and a loudspeaker means receiving said analog signal from said converter means so as to generate said alarm sound and said speech sound signals.

7. The electronic alarm device as claimed in claim 6, wherein said microprocessor controlling means comprises:

a relay means having a first fixed contact connected to said first microprocessor means, a second fixed contact connected to said second microprocessor means, and a movable contact arm to be selectively connected to one of said first and said second fixed contacts; and a relay controlling means including a binary counter means actuated by said control switch means and having a recurring digital output, and a logic circuit means supplying current to said relay means in a first direction so as to electrically connect said movable contact arm and said first fixed contact until said recurring digital output has reached a predetermined count, and in a second direction so as to electrically connect said movable contact arm and said second fixed contact when said recurring digital output has reached the predetermined count.

* * * * *